United States Patent [19]
Klaue

[11] 3,966,008
[45] June 29, 1976

[54] BRAKE SYSTEM FOR VEHICLES

[76] Inventor: Hermann Klaue, 24, Tour D'Ivoire, 1820 Montreaux, Switzerland

[22] Filed: July 11, 1975

[21] Appl. No.: 595,007

Related U.S. Application Data

[63] Continuation of Ser. No. 331,697, Feb. 12, 1973, abandoned, which is a continuation-in-part of Ser. No. 171,866, Aug. 16, 1971, abandoned.

[30] Foreign Application Priority Data

| | | |
|---|---|---|
| Aug. 24, 1970 | Germany | 2041867 |
| July 19, 1971 | Switzerland | 10561/71 |
| Apr. 7, 1972 | Switzerland | 5122/72 |

[52] U.S. Cl. ............................. 180/75; 188/106 P
[51] Int. Cl.² ............................................ B60T 8/02
[58] Field of Search ............. 180/75, 82 R, 103 BF; 188/106 P, 349, 271, 112; 303/6 C

[56] References Cited
UNITED STATES PATENTS

| | | | |
|---|---|---|---|
| 2,062,167 | 11/1936 | Dieter | 188/106 P X |
| 3,062,332 | 11/1962 | Bailey | 188/112 |
| 3,180,444 | 4/1965 | Hause | 180/75 |
| 3,253,672 | 5/1966 | Minika | 180/75 |
| 3,288,232 | 11/1966 | Shepard | 180/82 R |
| 3,329,244 | 7/1967 | Nielsen | 188/106 P X |
| 3,499,689 | 3/1970 | Carp | 180/82 R |

FOREIGN PATENTS OR APPLICATIONS

| | | | |
|---|---|---|---|
| 1,483,487 | 4/1967 | France | 188/196 P |

*Primary Examiner*—M. H. Wood, Jr.
*Assistant Examiner*—Terrance L. Siemens

[57] ABSTRACT

In a vehicle having driven and non-driven wheels and driven and non-driven shafts a brake system including wheel brakes and auxiliary drive line brakes. The auxiliary drive line brakes are designed with a heat absorbing capacity to absorb at least twice the maximum heat energy as the wheel brakes. The auxiliary drive line brakes are watercooled friction disc brakes operating without self-intensification and comprising dry friction elements. The brake system further comprises actuating means including a singular application means and separate brake circuit means for the drive line brakes and the wheel brakes. The actuating means forces the system to operate the auxiliary drive line brakes alone in a first mode of operation during which the wheel brakes remain unbraked and to then operate the system in a subsequent second mode of operation in which the wheel brakes are operated in addition to the drive line brakes such that the total applied braking moment is distributed to each wheel approximately in proportion to the dynamic load on that wheel.

17 Claims, 15 Drawing Figures

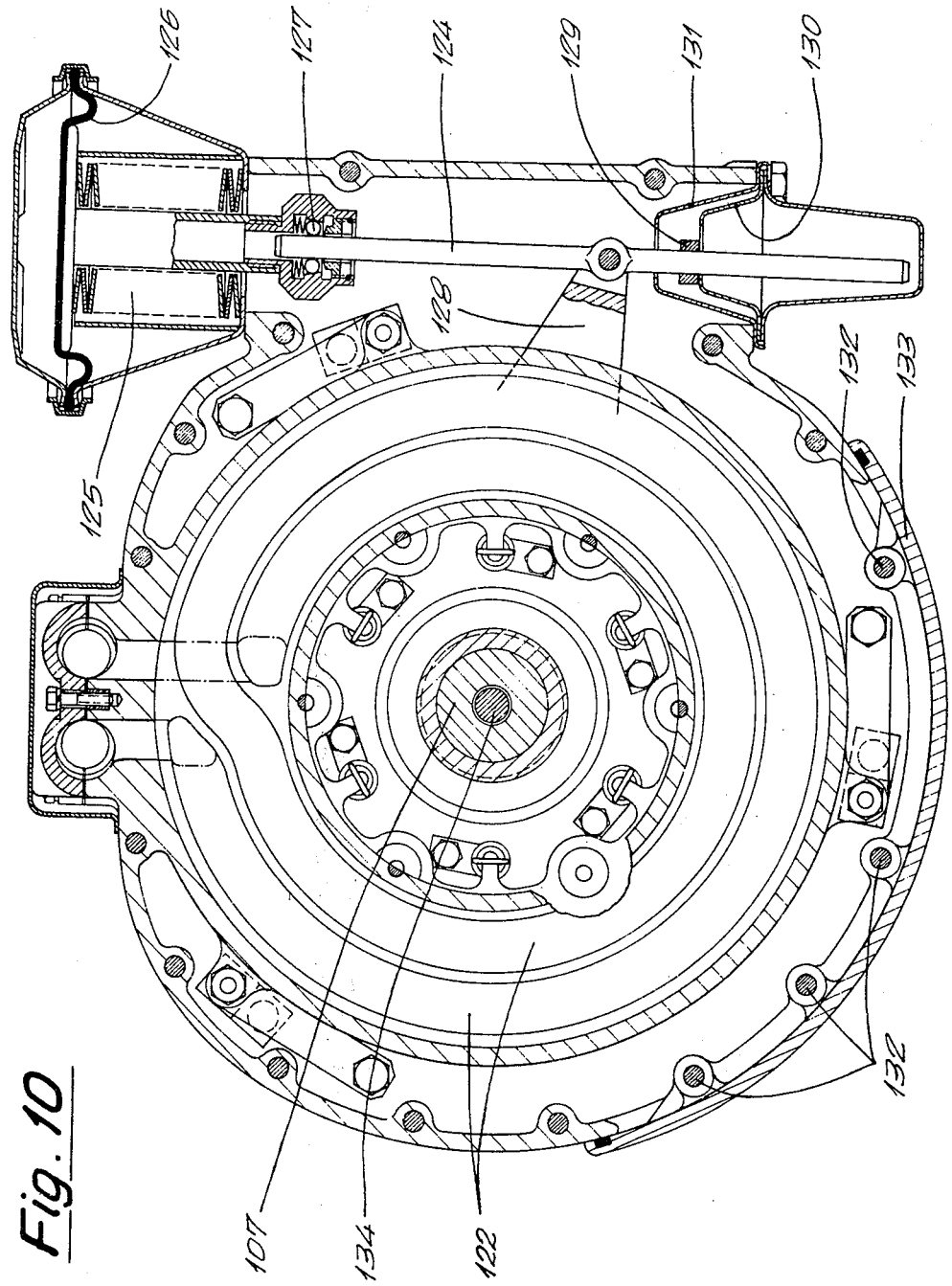

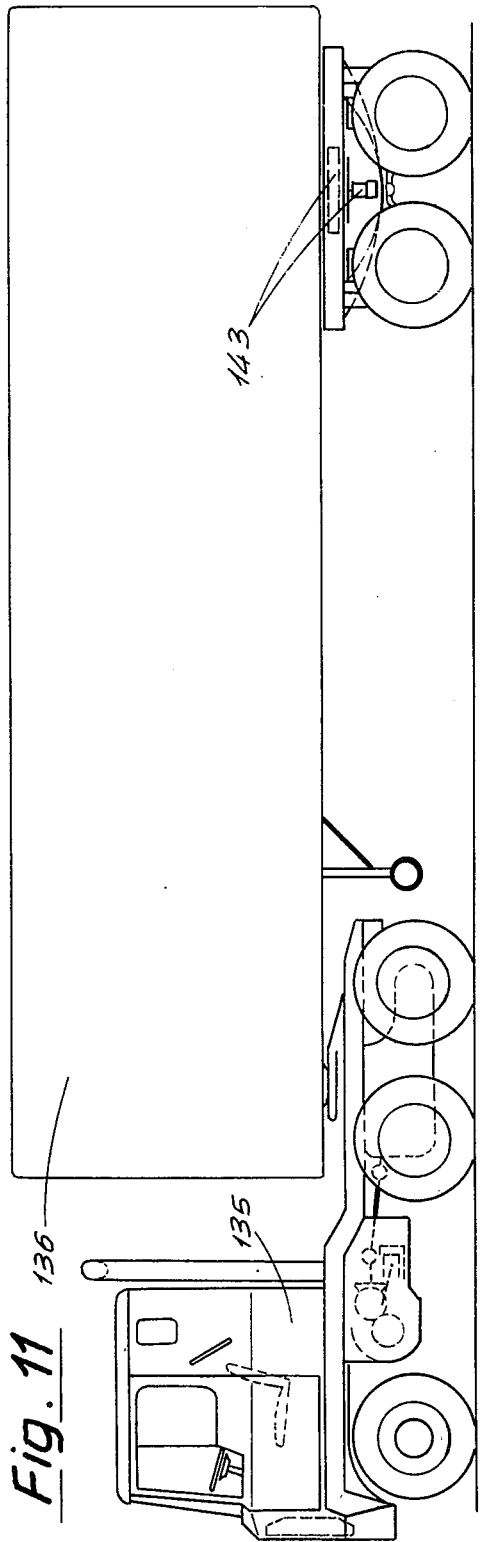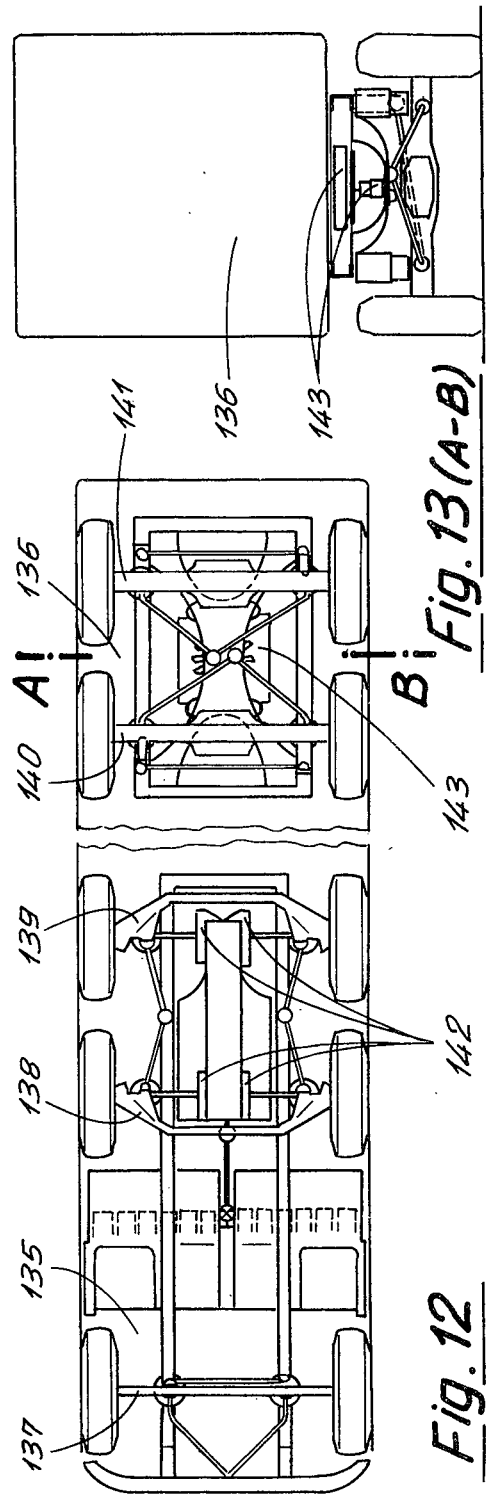

BRAKE SYSTEM FOR VEHICLES

This is a continuation of application Ser. No. 331,697, filed Feb. 12, 1973, now abandoned, which is in turn a continuation-in-part of application Ser. No. 171,866, filed Aug. 16, 1971, now abandoned.

BACKGROUND OF INVENTION

This invention relates generally to brake systems in vehicles and more particularly to brake systems having both auxiliary drive line brakes and wheel brakes.

The term "auxiliary drive line." or "auxiliary brake" refers to brakes which are employed in the power train drive line from the engine to the driven wheels to assist the wheel brakes, as is known to be required in heavy vehicles such as buses and trucks. This function, which shall be referred to hereinafter as "auxiliary braking" requires a brake which may even have smaller force transfer capabilities than wheel brakes, but a much greater ability to absorb heat energy created during braking than wheel brakes.

Trucks and motor-coaches are being equipped with ever more powerful driving engines so that the mean operating speeds increase while it becomes impractical to enlarge the brakes in the wheels. In order to relieve the wheel brakes, so-called retarders have been employed in which the braking energy is converted electrically or hydrodynamically. Apart from the disadvantage of the comparatively great weight and large expenditure, such retarders have the drawback that their no brake moment is dependent on the driving speed and no linear characteristic corresponding to that of a friction brake operating without self-intensification. Self-servo is the tendancy of brake elements operating in a liquid medium to come together, because of hysteresis effects therein; as a result thereof, brake application does not vary linearly with the applied braking force. Their effect is virtually dependent on the square of the speed. The braking action of the retarder is superimposed upon the braking action of the wheel brakes during braking. The function of locking regulators, the provision of which will become preferable within the next few years, is then illusory on the wheels on which the retarder operates for the driver cannot be expected at the moment of emergency braking first to cut out the retarder before actuating the wheel brakes. A further disadvantage is the comparatively long release time of a retarder which does not meet the prerequisite most important for anti-locking regulation, viz, the capability of reducing the brake moment promptly.

Other proposals relate to brake systems which involve in addition to the wheel brakes a brake connected to the transmission system.

In these brake systems, the transmission brake is provided for emergency braking or parking applications (U.S. Pat. No. 2,140,040, British Pat. No. 1,143,793). However, this transmission brake is not suitable for auxiliary braking in the same manner as the drive line brake of the present invention. Another proposal is known (British Pat. No. 992,703), in which a brake system involves two different brakes wherein one is actuated before the other by a common pedal. The first so-called "retarding" brake was proposed to provide a coolant circulated disc brake having the rotating parts within the coolant. Such brake systems have never been realised in practice because of the difficulty in providing suitable auxiliary braking. Oil or coolant circulated disc brakes are not practical because of the comparatively low dissipation of the heat occurring during auxiliary braking by oil or other usual coolants. High heat dissipation requires large brake assemblies requiring a great expenditure apart from the necessity of providing coolant filters. Another disadvantage arises in the fact that the friction coefficient is dependent on the velocity. This causes a non-linear characterisitc and excludes the provision of anti-locking devices in a brake system of this kind so that no progress is achieved with respect to the use of the above retarder.

With the state of the art as exemplified by the foregoing, the main object of this invention is to provide a brake system which has one or more drive line brakes constituting an auxiliary brake means, and conventional wheel brakes. the auxiliary brake relieves the load on the wheel brakes and allows the provision of anti-locking devices in the brake system.

It is a particular object of this invention, to provide an auxiliary drive line brake which is designed for auxiliary actuation having at least twice the maximum brake energy as the wheel brakes. The auxiliary brake is a watercooled disc brake having dry friction parts, operating without self-intensification effect and having a linear brake characteristic. Friction self-intensification means that the braking effect of a brake is not linear with regard to the friction coefficient of the friction lining but depends on latter, raised to a higher power. A brake with high friction self-intensification is sensitive, as at the smallest fluctuation of the friction coefficient which can occur through entering of water and dirt and/or at high temperature, the braking effect is changed to such an extent that the whole distribution of braking power on each wheel is questionable. Therefore, brakes with high friction self-intensification are no longer used in modern vehicles. A brake without friction self-intensification whereby the braking moment is directly proportional to the friction value of the friction lining, does not show these disadvantages as the braking moment only changes proportionally with the friction value of the lining.

It is a further object of this invention to provide actuating means for the auxiliary drive line brake and the wheel brakes, including a singular application mean and separate circuit means. The actuating means operates said auxiliary drive line brake alone in a first mode of operation during which said wheel brakes remain unbraked and operates in a subsequent second mode of operation said wheel brakes in addition to said service brakes such that the total applied braking moment is distributed to each wheel approximately in proportion to the dynamic load distribution on that wheel.

A further object of the invention is the provision of adjusting means by which the auxiliary drive line brake is operated with a constant or slower increasing brake moment beginning with a predetermined retardation.

Another object of the invention is the provision of an anti-locking arrangement in combination with the brake system. The anti-locking arrangement includes means to control the auxiliary drive line brake and the wheel brakes simultaneously.

It is a further object of this invention to provide a brake system for a truck-trailer combination. Both the truck and the trailer are equipped with shaft brakes constituting the auxiliary drive line brakes. The auxiliary brakes are watercooled disc brakes operating without self-intensification and designed for auxiliary braking actuation. The combination is provided with a singular application mean by which actuation first the trailer auxiliary brake, than the truck trailer auxiliary brake and finally the wheel brakes are subsequently effected. This provides a stretched condition of the combination preventing jack-knife. The design of the auxiliary brakes allows the provision of anti-locking devices for all wheels.

The foregoing and other objects and advantages will become apparent in view of the following description taken in conjunction with the drawings, wherein:

FIG. 10 is a cross section through the service brake of FIG. 8;

FIG. 11 is a side view of a truck-tractor with a semi-trailer employing a brake system according to this invention;

FIG. 12 is a view from below of the vehicles of FIG. 11;

FIG. 13 is a view from behind of the vehicles of FIG. 11;

Figure 1:
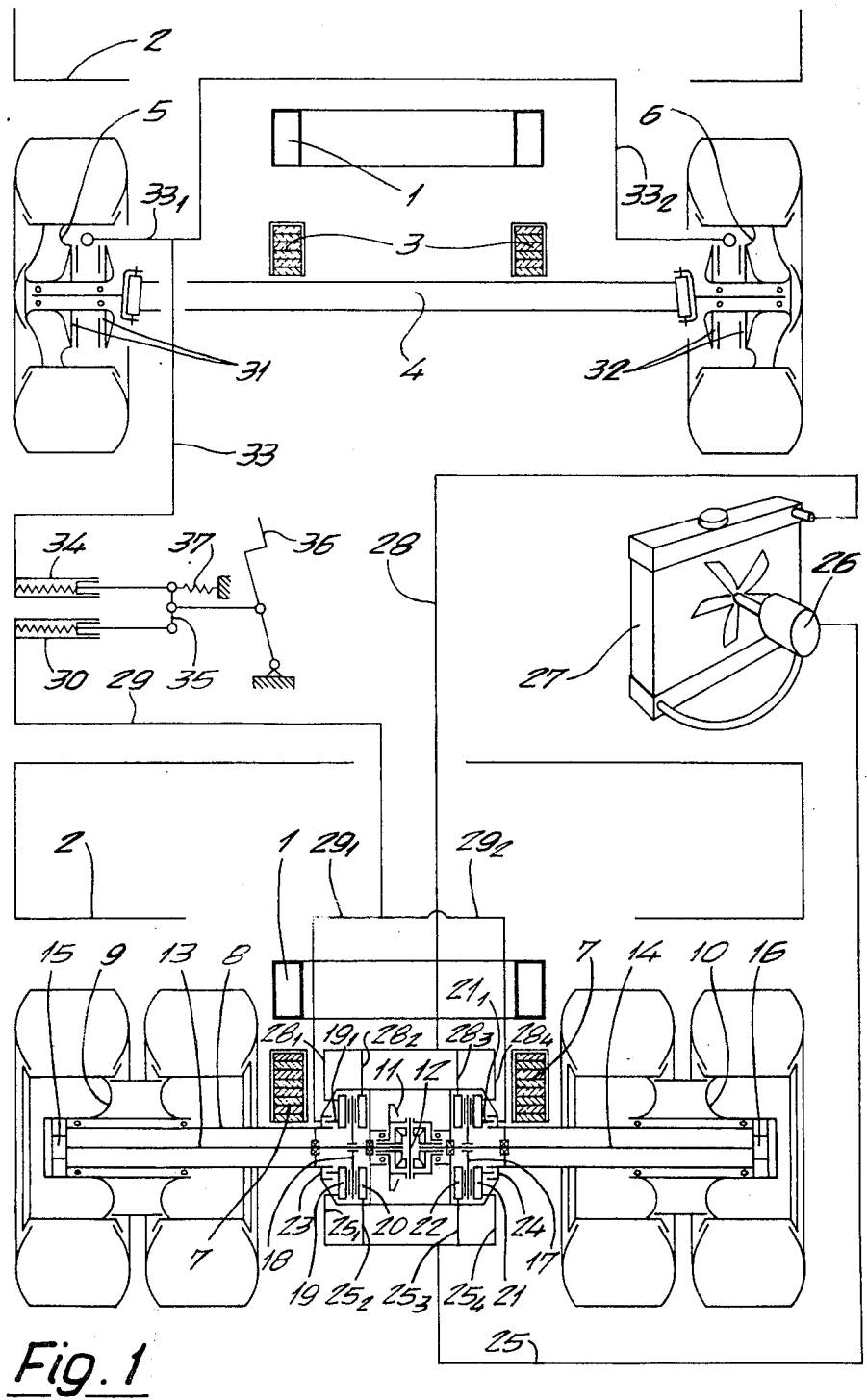
FIG. 1 is a plan view of a brake system in a vehicle having the auxiliary brake located in the axle body.
Figure 2:
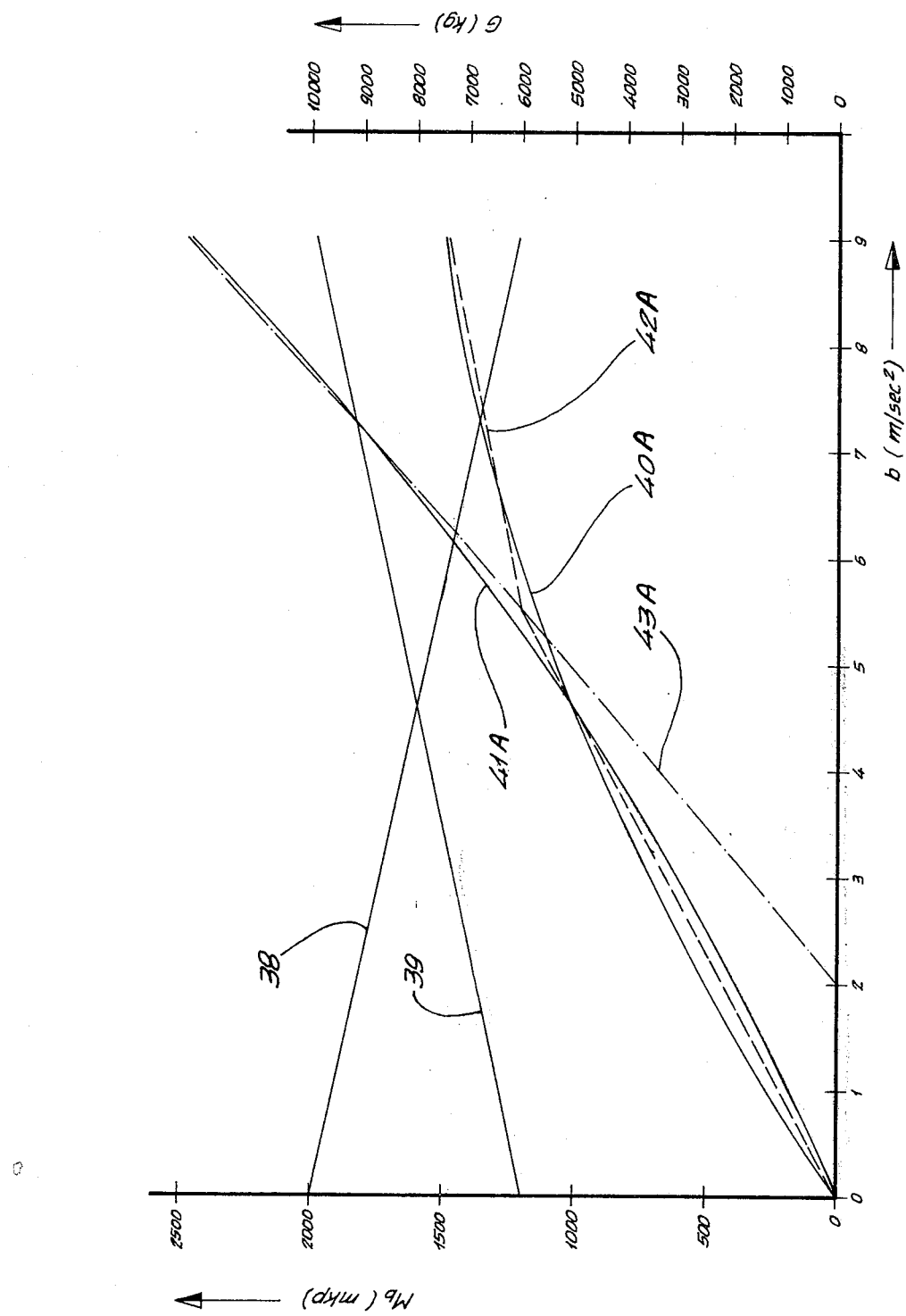
FIG. 2 is a diagram for the brake system of FIG. 1, wherein the axle load and the brake moment are plotted against the retardation.

FIGS. 1 and 2 show a first embodiment of the invention, wherein reference numeral 1 designates the vehicle frame, 2 the body, 3 the front-axle springs which support the front axle 4 relative to the frame 1 and carry the wheels 5 and 6 on swiveling axle stubs. The springs 7 support the rear axle 8 relative to the frame and carry the wheels 9 and 10 which are driven by the crown wheel 11 via the differential gear 12, the driving shaft parts 13 and 14 and the planetary gears 15 and 16. The water cooled auxiliary brake includes the laminations 17, 18, the brake rings 19, 20, 21, 22 and hydraulic means 23, 24. Arranged on the driving shaft part 14 is the lamination 17: on driving shaft part 13, the lamination 18. During the braking operation, the rotating lamination 18 is forced, by the water cooled axially mobile brake ring 19, against the brake ring 20 which is firmly attached to the axle housing, possibly forming a component of the axle housing and also liquid-cooled. Actuation is effected in that oil is forced into the brake actuating ring cylinder 23, which displaces the brake ring 19 through the extension $19_1$ towards the center of the axle. Analogously, the lamination 17 is moved towards the center of the axle by the liquid-cooled brake ring 21 via the brake actuating ring cylinder 24, and the two linings of the disk are locked in the circumferential direction between the fixed liquid-cooled braking rings 21 and 22. The auxiliary brake has at least twice the brake energy absorption capacity as the wheel brakes.

In the present embodiment the liquid-cooled brake rings are connected to the cooling circuit of the engine. The cooling water is obtained from the radiator 27 by the pump 26 and forced, via the line 25 with branches $25_1$, $25_2$, $25_3$, $25_4$ into the liquid-cooled brake rings, then to be returned, via the branches $28_1$, $28_2$, $28_3$, $28_4$ and the line 28, into the radiator. The actuating oil for the service brake is supplied from the principal cylinder 30 via the hydraulic line 29 with branches $29_1$, $29_2$. The front-wheel disk brakes 31 and 32 are actuated, via the branches $33_1$ and $33_2$ of the oil pressure line 33, by the principal cylinder 34. Both principal cylinder pistons are connected with the brake pedal 36 via an equalizing lever 35. The biased tension spring 37 ensures that, in braking, the service brake is exclusively actuated until a force is reached which corresponds to the bias of the spring 37.

The diagram in FIG. 2 in which axle load, i.e., the weight of the vehicle applied to that axle, is plotted on the left side and brake moment is plotted on the right side, and brake retardation force is plotted horizontally, the axle-load and brake moment curves are shown in dependence on the braking retardation. FIG. 2 shows the decrease of overall weight of the vehicle applied to the rear-axle with curve 38 and, with curve 39, the increase of the overal weight of the vehicle applied to the front-axle at increasing retardation. Both lines intersect at about 4.6 m/s², i.e. at this retardation the weight of the vehicle is applied equally to the front and rear axles. The curves 40A and 41A represent the theoretical brake moment: the rear axle must be braked according to the brake moment curve 40A and the front axle according to the curve 41A if the total applied braking moment is to be distributed to the wheels in proportion to the load of the respective wheels. In this embodiment the brake moment distribution, as shown at 43A is so selected that the front axle is braked only from 2 m/s² and then rises straight to the maximum value which approximately corresponds to the theoretical curve 41A. In the upper reach, i.e. above 5 m/s² retardation, curve 43A gives a good approximation to the theoretical curve as shown at 42A, however, the liquid-cooled auxiliary brakes are actuated immediately according to this invention. At the point of intersection between the straight line 42A of the auxiliary brake moment and the curve 43A of the front-wheel brake moment, actuation of the auxiliary brake in the present case is so adjusted that the auxiliary brake moment is increased only more slowly as shown at the upper part of 42A so as to adjust itself to the theoretical path of the curve 40A. The slower increase of the brake moment for the driving axles may also begin at the point of intersection of the theoretical brake moment curves 40A and 41A. In practice, such a brake moment path can be achieved by arranging, in the distributing linkage of actuation, i.e. on the equalizing lever 35, appropriately biased springs.

A brake system designed according to the braking paths 42A, 43A ensures, in the case of minor retardations in which the total applied braking moment is only partly used, that only the auxiliary brakes with heat absorbing capacity conceived for sustained action are utilized.

In emergency braking, which is as such necessary more rarely and where only little thermal load occurs owing to the short braking time, the braking moment is adjusted to actual wheel loads.

Figure 3:
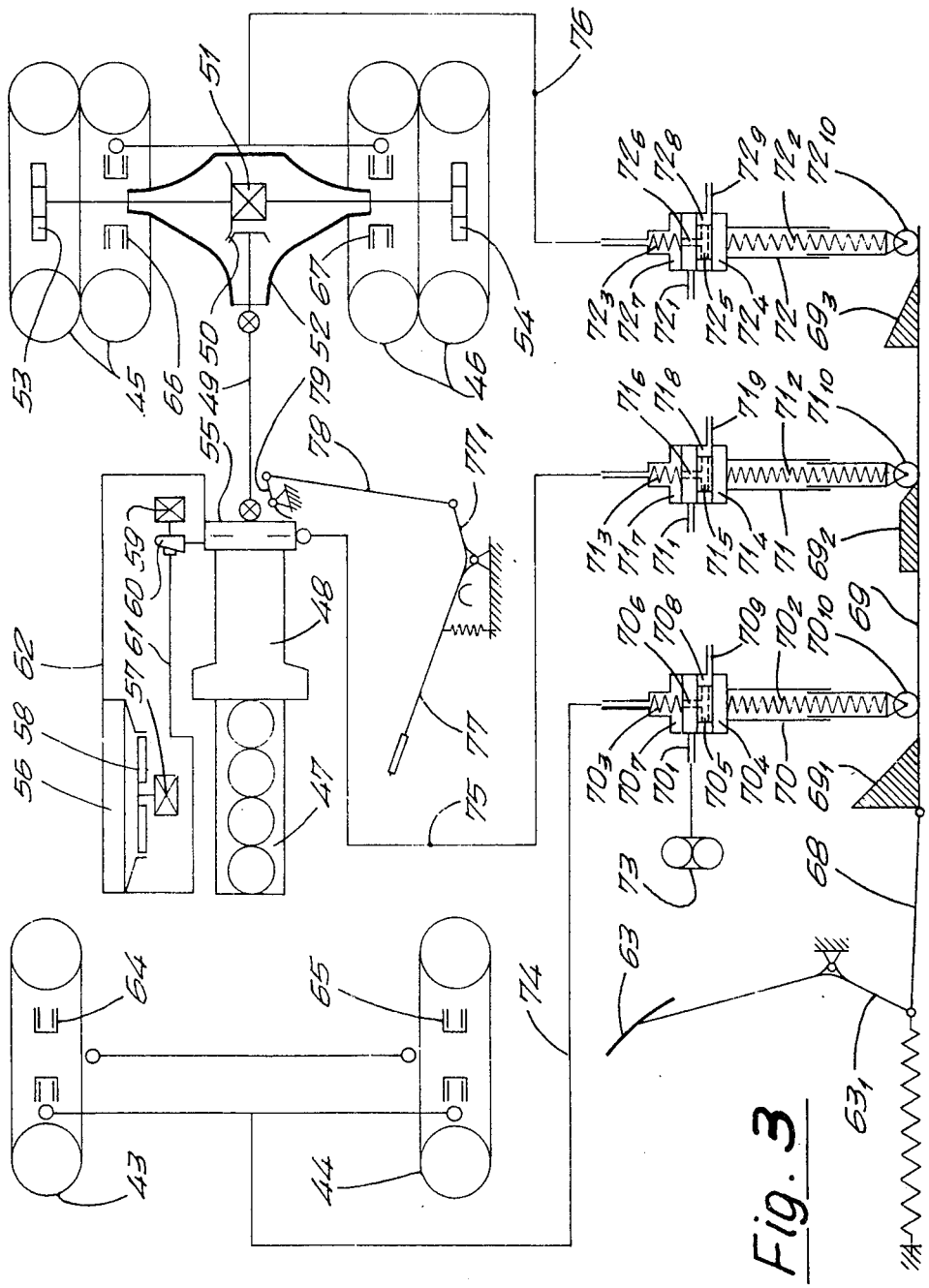
FIG. 3 is a plan view of a brake system in a vehicle having the auxiliary brake located on the transmission box.
Figure 4:
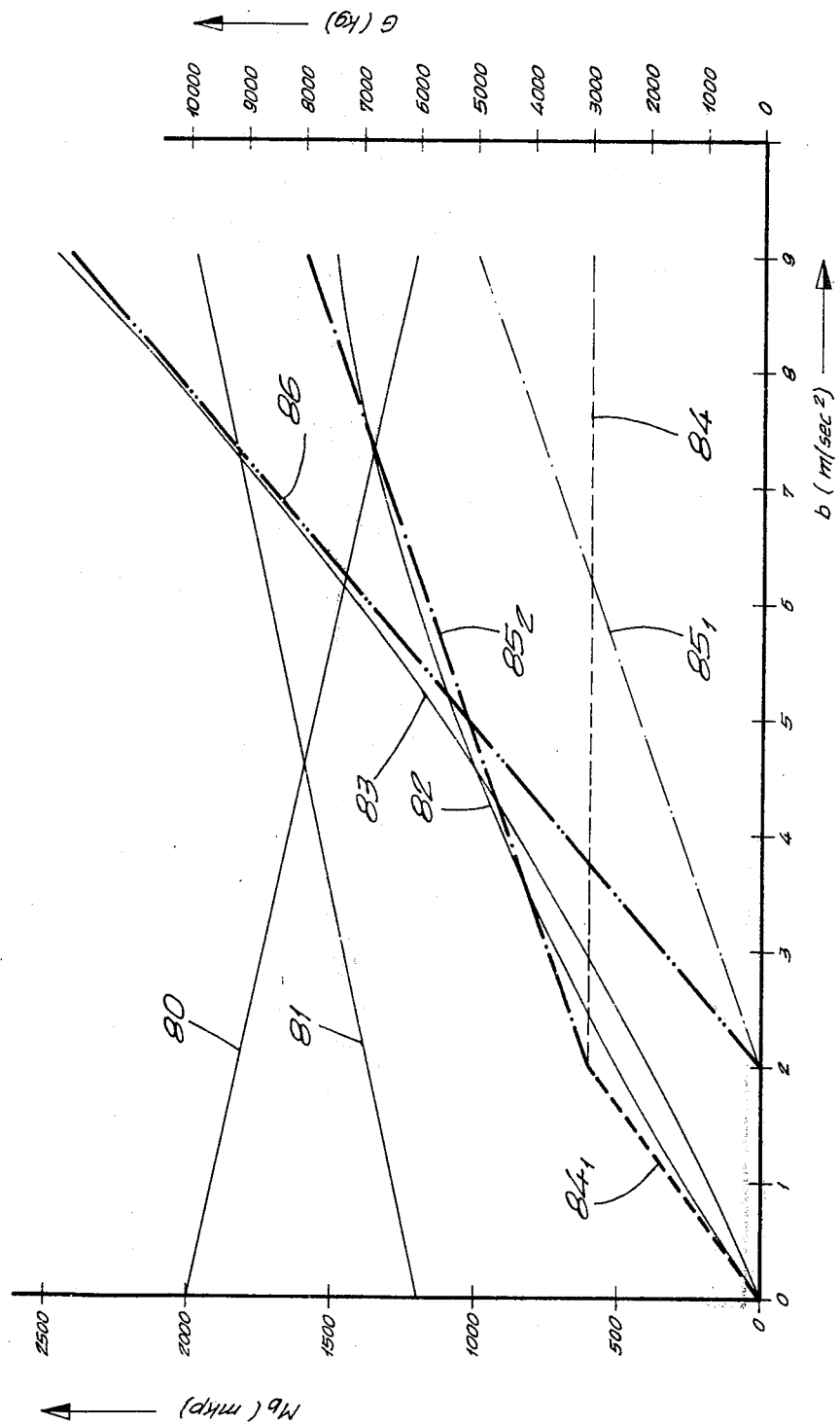
FIG. 4 is a diagram similar to FIG. 2 but for the brake system of FIG. 3.

In the embodiment shown in FIGS. 3 and 4 the wheels are designated by 43, 44, 45 and 46, the wheels 43 and 44 represent the wheels of the steering axle which are not driven and 45 and 46 the wheels of the driving axle which is not steered. The engine 47 drives, via the gear-box 48 and the driving shaft 49, the pair of bevel gears 50 which in turn drives, via the differential gear 51 in the driving axle 52 and the planetary gears 53, 54, the driving wheels 45 and 46. Designated by 55 is the auxiliary drive line brake designed for auxiliary braking operation and mounted to a stationary part of the vehicle, for example on the transmission box. According to this invention, the auxiliary brake 55 is a watercooled disc brake, operating without self-intensification effect, and having dry friction elements. An example of this auxiliary brake is in my co-pending application Ser. No. 340,959. The auxiliary brake is preferably cooled by the water of the engine radiator 56 which is ventilated by a fan 58 driven by an electric motor 57. A water pump 60 driven by the electric motor 59 provides the cooling-water circulation to the brake via the lines 61 and 62. The motor 59 is started by a switch on the brake pedal when the latter is actuated. In the present embodiment it is assumed that all brakes are hydraulically operated by appropriately adjusted pump pressure. The wheel brakes of the front wheels are designated at 64, 65 and those of the driving wheels at 66, 67. The brake pedal 63 with a lever extension $63_1$ is connected, via linkage 68, with a cam 69 which actuates the three control valves 70, 71 and 72 which, in braking, supply pressure oil, correspondingly regulated and supplied by the pump 73, to the brakes.

The control valves are similarly designed. Only the design of the valve 70 is therefore described: the two other valves possess the same components which are designated by the corresponding indexes of the other numerals 71 and 72. The hydraulic oil removed from the oil-sump by the pump 73 is supplied to the valve via the pressure line $70_1$. The control slide $70_4$ held in zero position by the control spring $70_2$ and the counterpressure spring $70_3$ is provided with a recess $70_5$ of which the edges serve as control edges. A transverse and longitudinal bore $70_6$ connects, from the recess $70_5$, the control pressure chamber $70_7$, which is connected with the front-wheel brakes 63 and 64, with the annular chamber $70_8$. The valve is normally relieved via the line $70_9$, i.e. the brakes are not under pressure. Motion of the cam slide and engagement of the roller $70_{10}$ on the gradient of the cam $69_1$ biases the compression spring 70 and displaces annular chamber $70_8$ into communication with the supply line $70_1$ until a controlling pressure is built up by flow from $70_1$ to $70_8$, $70_5$ and $70_6$ in the pressure control chamber $70_7$, which pressure corresponds to the load difference between the two springs $70_2$ and $70_3$. The valve 71 controlled by the cam $69_2$ supplies, during the braking process, pressure oil via the line 75 to the gear brake 55 and the control valve 72, by engagement with the cam $69_3$, via the line 76, to the rear-wheel brakes 66 and 67. The configuration of the cams reveals that depressing of the brake pedal first actuates the control valve 71. As soon as the full operating pressure of the auxiliary brake has been achieved, the valves 70 and 72 are additionally actuated by contacting the cams $69_1$ and, respectively, $69_3$. The details of this function will be described later in the context of the diagram of FIG. 4. Provided for the mechanical actuation of the auxiliary brake 55 is the hand-braking lever 77 which mechanically actuates, via a lever extension $77_1$ a pull rod 78, the toggle lever 79 and thus the brake 55. Plotted against the braking retardation b in FIG. 4 is the axle load on the left and the brake moment, on the right, the latter being applicable to the two brakes of each axle. Line 80 shows the path of the dynamic axle load i.e. the vehicle weight, on the rear axle and the line 81 that of the front axle. The two curves 82 and 83 indicate the path of the brake moment of the associated axles in the case where the total braking moment is applied to each wheel in proportion to the dynamic axle load distribution on that wheel. The broken line $84_1$, 84 shows the path of the brake moment for the auxiliary brake. It may be noted that, in the present case, as shown at $84_1$ the braking of the vehicle up to a retardation of 2 m/s$^2$ is effected solely by the auxiliary brake and that as shown at 84, the auxiliary brake is actuated with a constant brake moment above this retardation. The brake moment curve corresponds to the design of the cam $69_2$. At 2 m/s$^2$ retardation, the wheel brakes of both the steered and the driving axle are actuated. The line $85_1$ represents the brake moment curve wheel of the brakes of the driving axle. Since the brake moment of the auxiliary brake is superimposed on the brake moment of the wheel brakes in the driving axle, the path of the brake moment acting on the driven wheels is determined, owing to the downstream actuation of the wheel brakes, solely by the rising section of the brake moment curve $84_1$ of the service brake and then by the added brake moment curve as per line $85_2$. The brakes of the steered axle are actuated as per the brake moment 86. The brake moment curve path for the wheel brakes of the non-driven and of the driven axles corresponds to the cams $69_1$ and $69_3$ of the cam slide 69 in FIG. 3.

If the brake moment curve actually obtained is compared to the theoretical path 82/83, it is found that, during retardation above roughly 4.5 m/s$^2$, approximation of the actual path to the theoretical one is obtained. This is necessary only in the upper retardation range since it is only there that the applied braking moments are more strongly utilized. It is also necessary in the application of locking regulators to strive for good approximation of the brake moments to the theoretical curves in the upper range of the brake moment curves since the locking regulator becomes functional only in the case of extreme utilization of the applied braking moments. In the lower range of the brake moment curve it can be recognized that to 2 m/s$^2$ and thus virtually in all gradiental braking operations, substantially the service brake designed for sustained action is employed for the transformation of braking energy into heat.

Figure 5:
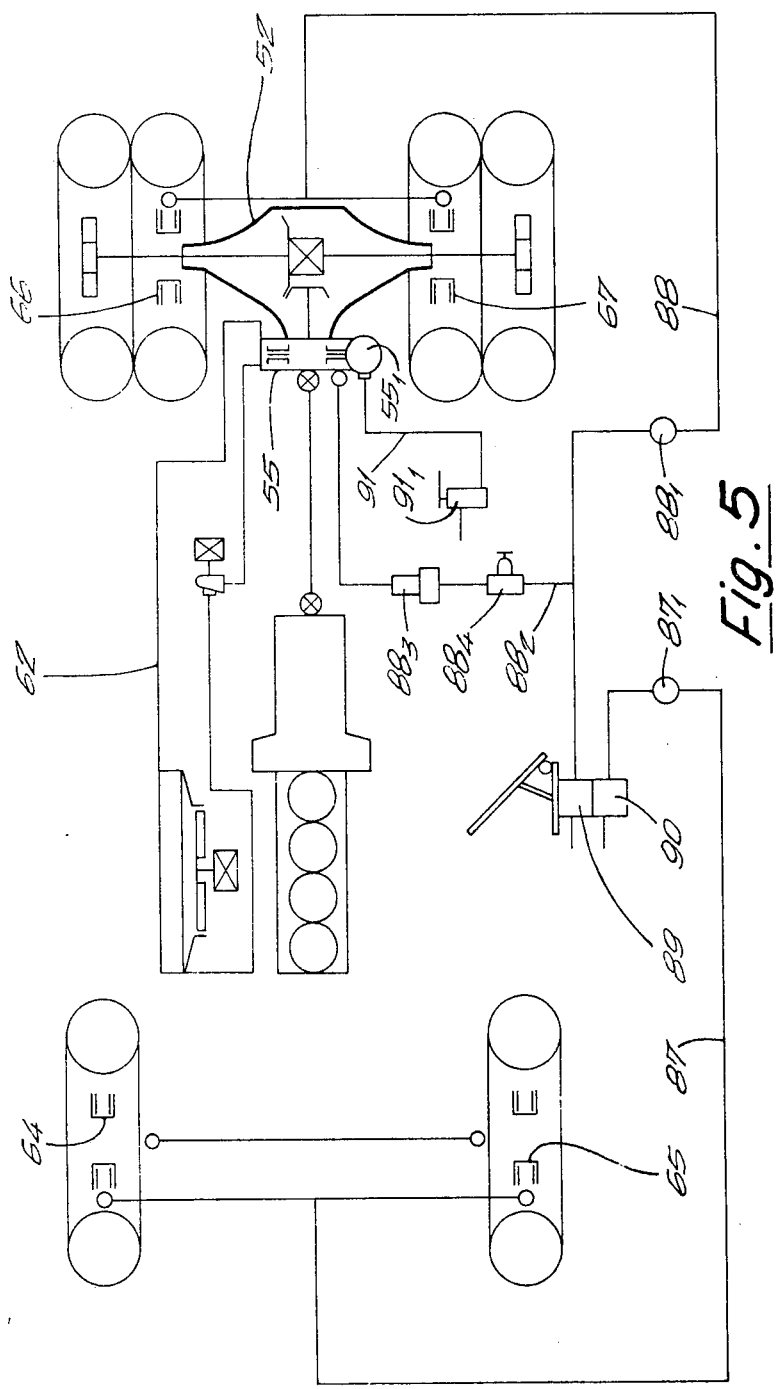
FIGS. 5 and 6 are plan views of further embodiments of the brake system.
Figure 6:
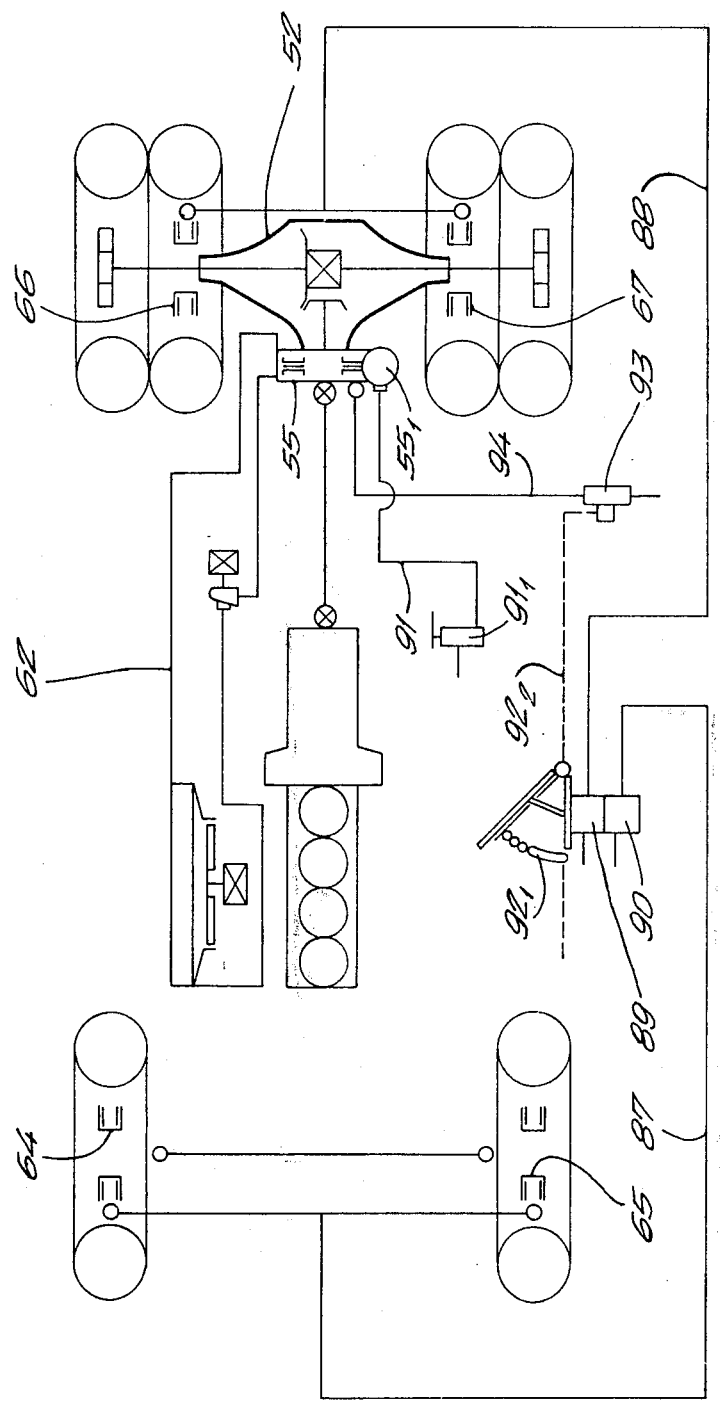

Further embodiments of similar brake systems are shown in FIGS. 5 and 6 using the reference numerals employed in FIG. 3 for same parts. In these figures, however, the sustained-action auxiliary brake 55 operating on the driving shaft is attached to axle 52. Referring to FIG. 5 the front-axle brakes 64 and 65 are connected to the braking circuit 87 and the rear-axle brakes 66 and 67 to the braking circuit 88 and actuated by the two actuating valves 89 and 90 arranged behind one another. Arranged in the braking circuits 87 and 88 each is a non-return valve $87_1$ and $88_1$ so that up to an adjustable pressure, by way of example 2 kg/cm$^2$, only the auxiliary brake 55 is actuated via the ancillary circuit $88_2$ with compressed-air/hydraulic converter $88_3$ and relief valve $88_4$. The relief valve $88_4$ then generates the curve of the actuating pressure as designated at 84 in FIG. 4. The auxiliary brake 55 is additionally equipped with a spring storage cylinder $55_1$ of which the spring is normally biased by compressed air from the compressed-air line 91. The hand braking valve $91_1$ enables the air to be drained from the spring storage cylinder. The auxiliary brake is then employed as a holding brake with an unlimited brake moment.

As compared with the embodiment according to FIG. 5 where two principal braking circuits are provided for pedal actuation, three braking circuits are provided in the embodiment according to FIG. 6. The various braking circuits are equipped with separate compressed air tanks (not shown). The front-wheel brakes are actuated by the compressed air circuits 87 with the valve 90 and the rear-wheel brakes by the compressed air circuit 88 with the valve 89. The auxiliary brake 55 is controlled by an electrical controlling device which consists of the contacts $92_1$, control line $92_2$, solenoid control valve 93 and compressed air line 94. The arrangement of the spring storage cylinder and its actuation correspond to the embodiment according to FIG. 5. When the brakes are actuated, the valves 89 and 90 are so adjusted that the auxiliary brake is first supplied via the electrical actuation 91. Only when the break in the brake moment curve 84, which is located at 2 m/s² in FIG. 4, is reached, do the compression valves 89 and 90 begin to build up the operating pressure in the wheel brakes 64 through 67. Up to this point the braking pressure in the service brake is increased by stages.

Figure 7:
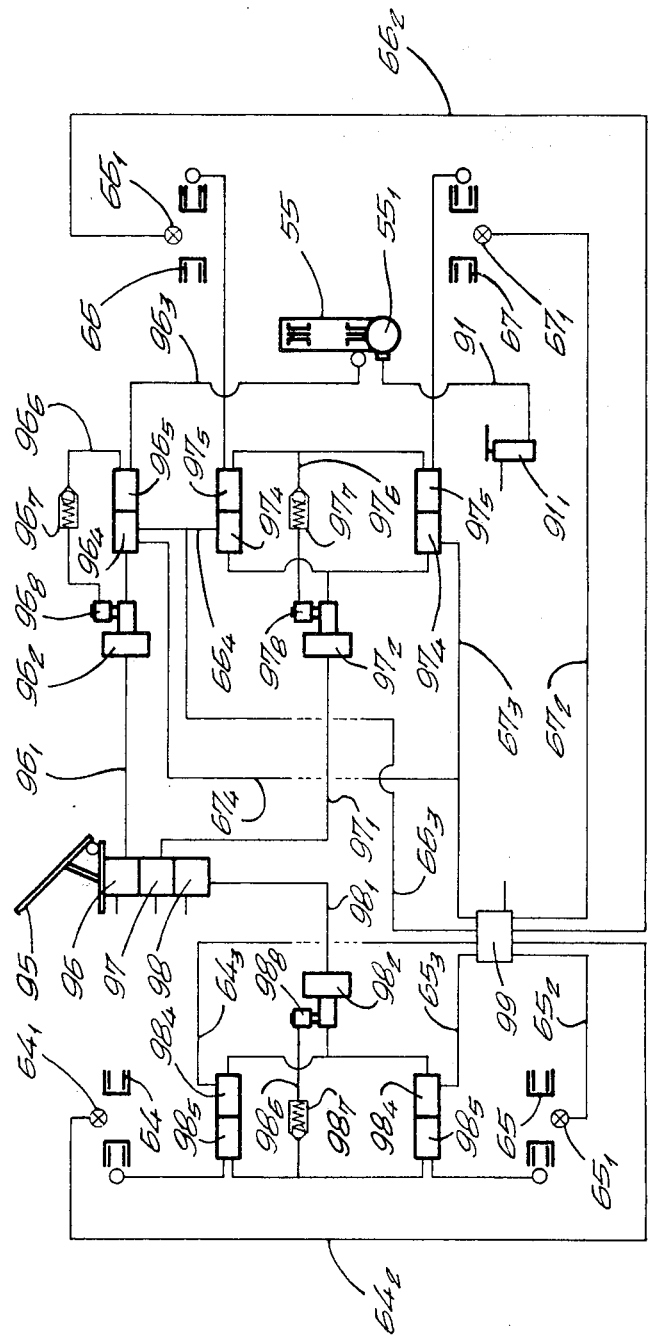
FIG. 7 is a plan view of an embodiment of a brake system equipped with an anti-locking system.

FIG. 7 shows a brake system according to an embodiment of this invention equipped with an anti-locking system having four wheel brakes and an auxiliary brake arranged on the transmission box. The wheel brakes are again designated by 64, 65, 66, 67 and the auxiliary brake by 55. The braking pedal 95 controls the control valve 96 for the actuation of the sustained-action auxiliary brake 55, the control valve 97 for the actuation of the rear-wheel brakes and the control valve 98 for the actuation of the front-wheel brakes. The control valves 96, 97 and 98 are so adjusted that, when the pedal 95 is depressed, compressed air is first passed, through the line $96_1$, into the compressed-air/hydraulic converter $96_2$ which actuates the sustained-action auxiliary brake 55 via the hydraulic line $96_3$. Arranged in the hydraulic line $96_3$ is an inlet valve $96_4$ and an outlet valve $96_5$ of the locking regulation. The oil returning from the outlet valve $96_5$ in the locking process returns, via the line $96_6$ with the check valve $96_7$, to the equalizing tank $96_8$. Analogously designed are the braking circuits for the front-wheel and rear-wheel brakes, only the brakes on each side are provided with an inlet and an outlet valve. Incorporated in the wheel hubs are rotating sensors $64_1$, $65_1$, $66_1$ and $67_1$ which, when a predetermined angular retardation is exceeded, pass a measurement value to the electrical control unit 99 via the connected electrical lines $64_2$ through $67_2$, the said valve then causing closing, via the lines $64_3$ and, respectively $65_3$, $66_3$, $67_3$ of the inlet valve associated with the brake involved and causing opening, in the case of a further increase of the angular retardation, of the associated outlet valve. The valves $96_4$ and $96_5$ associated with the sustained-action auxiliary brake are connected to both the line of the rear-wheel brake 66 and the line of the rear-wheel brake 67 via the cables $66_4$ and $67_4$ so that the auxiliary brake 55 is simultaneously adjusted when the driven wheels lock.

Figure 8:
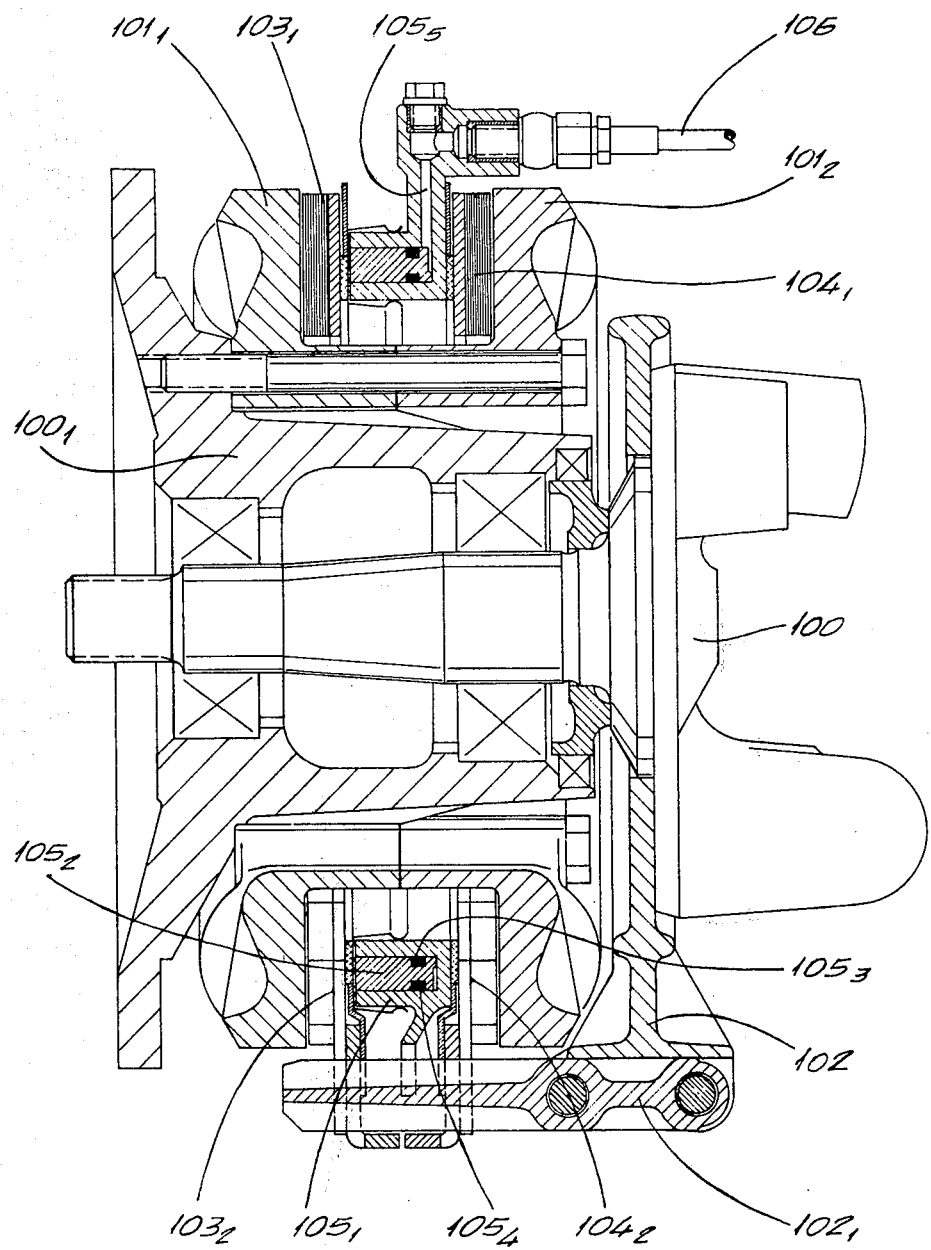
FIG. 8 is a longitudinal section through an example of a wheel brake.

FIG. 8 shows an example of a wheel brake which may be used in this brake system. It is a fully lined wheel disk brake operating without self-intensification effect of friction, actuated by a ring cylinder and arranged in the front-wheel hub of a truck. Arranged on the stub axle 100 pivoted to the axle is the hub $100_1$ which carries the two-piece ribbed brake housing $101_1$, $101_2$ in which the brake segments $103_1$, $103_2$, $104_1$, $104_2$ carrying the brake lining and the actuating unit comprising the ring cylinder $105_1$, ring piston $105_2$ with gasket rings $105_3$ and $105_4$ are suspended so as to be axially displaceable, while fixed in the circumferential direction to the arms $102_1$ of the brake carrier 102 bolted to the stub axles 100. The actuating pressure oil is supplied to the pressure ring chamber via a brake hose 106 and the bore $105_5$. A detailed description of further suitable wheel brakes is in my continuation-in-part application Ser. No. 288,287.

Figure 9:
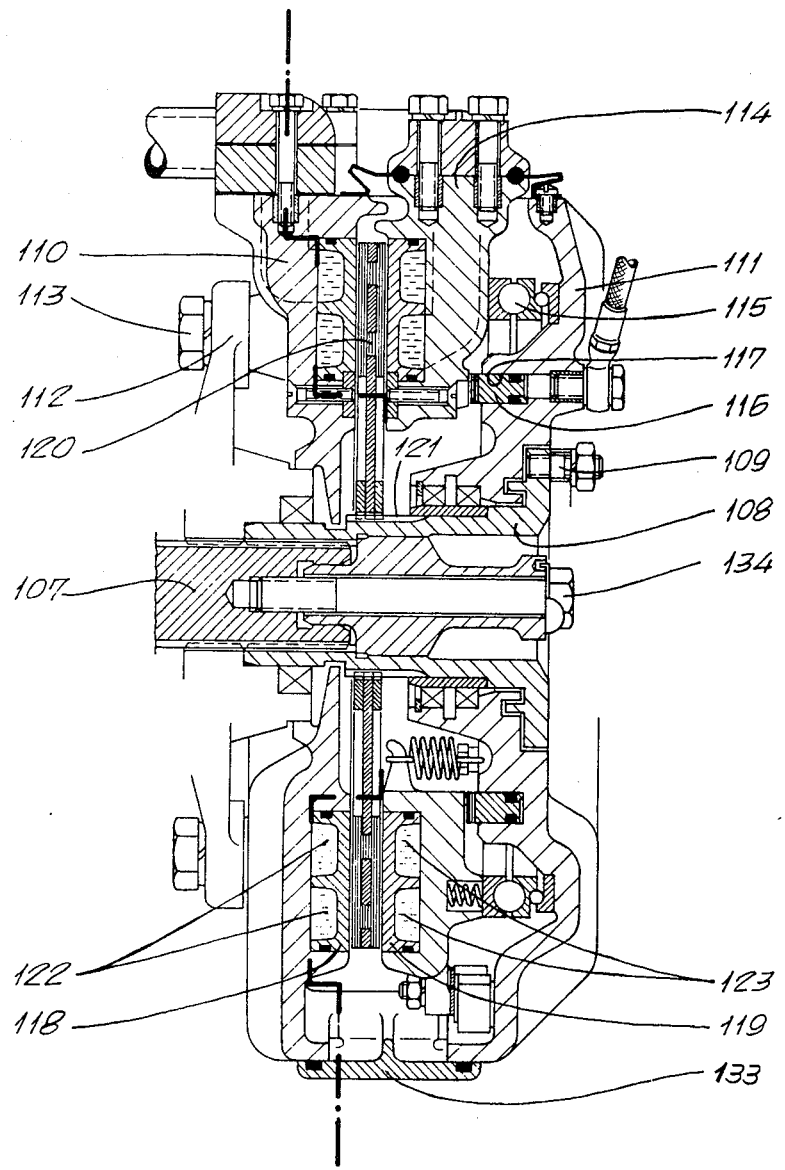
FIG. 9 is a longitudinal section through an example of an auxiliary brake.

An example of an auxiliary brake is shown in FIGS. 9 and 10. It is a hydraulically operated fully lined disk brake which may at the same time be mechanically actuated, by spring storage actuation, as a stopping brake. The reference numeral 107 designates the driven shaft of the transmission-box, 108 the coupling flange connected to the drive shaft (not shown) by bolts 109. The two-piece brake housing 110, 111 formed of light alloy is attached by bolts 113 to the carrier arm 112 which is part of the gear-box. The brake ring 114, which is fixed in the circumferential direction and movable in the axial direction, may be axially displaced for actuation both mechanically by an expanding device 115 which rests on the housing portion 111 and by a hydraulic ring 116 supported in a cylinder ring chamber 117 of the housing portion 111. The braking surfaces are formed by rings 118 and 119 formed of cast iron or a copper alloy. Rotating between the rings 118 and 119 is the lamination 120 equipped with a brake lining which is axially movable on a spline 121 of the driven flange 108. Arranged between the rings 118 and 119 and the housing portion 110 and, respectively, the brake ring 114 are hollow spaces 122 and 123 through which the cooling water flows. For the mechanical actuation of the brake, a spring storage cylinder 125 operates on the expanding device 115 via the rod 124, the said cylinder being released by compressed air which actuates the set of springs via the diaphragm 126. The spring storage cylinder is connected to the expanding device 115 via an infinitely variable longitudinal freewheel 127 and the lever 128. The amount of play is preserved by a clamping ring 129 on the rod 124 which normally rests on a sheet-metal hood 130 slotted for the passage of the rod 124 and comes to rest, when the brake play is exceeded, against the sheet-metal hood 131 over the hood 130 and causes the adjustment of the rod 124 by means of the freewheel 127. For replacing the disk 120 part of the attaching bolts holding the two brake housing portions 110 and 111 together is removed. These bolts 132 at the same time attach the cover 133 and are removed for changing the disk so that the cover 133 can be removed. For the axial displacement of the driven flange 108 the latter is attached to the driven shaft 107 of the gear-box by means of a bolt 134. After removal of the bolt 134 and prior to disconnection of the universal shaft, the flange may be axially pulled out of the brake so that the disk drops through the opening closed by the cover 133. Further examples of service brakes are in my application Ser. No. 340,959.

In truck-trailer combinations having both auxiliary and normal brakes the question is posed how to actuate these various brakes in view of a safe braking in all situations.

FIGS. 11 to 13 illustrate an embodiment of the brake system, provided for a truck-tractor with semi-trailer. The truck-tractor 135 has a steerable front axle 137 and two driven rear axles 137 and 139 wherein only the axle 137 is steerable. The steerable front axle 137 is provided with wheel brakes, the two rear axles 138 and 139 are of the socalled De-Dion type and provided with watercooled auxiliary brakes 142 assembled to the gear box. The semi-trailer 136 has two rigid axles 140 and 141. Located within their axle bodies are water cooled disc brakes providing another auxiliary brake for the combination. Between a radiator 143 and this brake are conduit means for the cooling. The radiator 143 is provided with an electrically driven fan and a pump and located on the trailer. According to this invention, the water cooled auxiliary brakes are actuated before the wheel brakes generally. Preferably at the beginning of the braking operation the watercooled auxiliary brakes of the semi-trailer 136 is actuated alone. Afterwards additionally, the auxiliary brakes 142 of the truck 135 and subsequently the wheel brakes are actuated. The actuation of the trailer brake before the truck brake is advantageous in order to keep the train stretched to prevent the jackknife of the semi-trailer due to its relative small wheel base: and for similar reasons all brakes of the combination should be provided with anti-locking devices.

Figure 14:
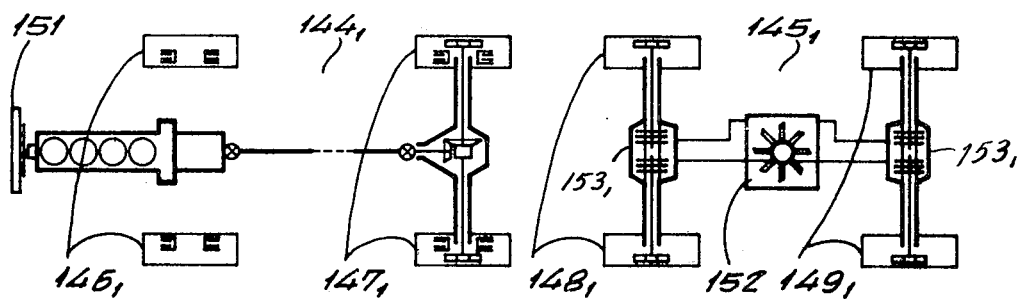
FIG. 14 is a schematic plan view of a truck-trailer combination employing a brake system according to this invention.
Figure 15:
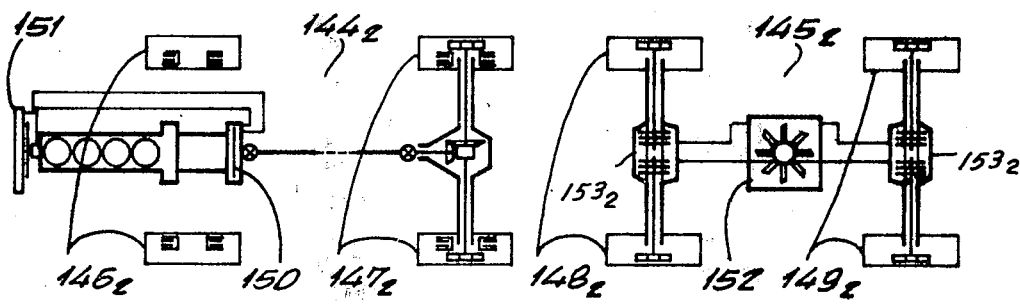
FIG. 15 is a schematic plan view of a truck-trailer combination employing another brake system.

FIGS. 14 and 15 show further embodiments of brake systems provided in truck-trailer combinations consisting of the trucks 144$_1$, 144$_2$ and the two-axled trailers 145$_1$, 145$_2$. The wheels 148$_1$, 149$_1$, and 148$_2$, 149$_2$ of the trailers 145$_1$ and 145$_2$ respectively are braked by watercooled auxiliary brakes 153$_1$ and 153$_2$ and provided in the middle of their axle bodies. These brakes comprise laminations rotating with the axle shafts of De-Dion type and hollow brake rings arranged between these laminations. The brake rings are part of a circulation circuit including the radiator 152 provided on the trailer. A detailed description of these brakes is in my co-pending continuation-in-part application of U.S. application Ser. No. 330,432, which has issued into U.S. Pat. No. 3,870,118 which issued on Mar. 11, 1975.

The truck 144$_2$ in FIG. 15 is provided with wheel brakes in all its wheels 146$_2$, 147$_2$. The wheel brakes are preferably disc brakes the kind as shown in FIG. 8. Further examples of disc brakes which may be used are described in my continuation-in-part application Ser. No. 288,287. The truck 144$_2$ further comprises an auxiliary brake 150 watercooled by a circulation circuit between the brake and the radiator 151. The auxiliary brake operates on the driving shaft and is mounted on the transmission box. An example of this brake is shown in FIGS. 9 and 10, but there may also be used others auxiliary brakes which are described in detail in my application Ser. No. 340,959.

In FIG. 15 rear wheels 147$_2$ are also braked by the auxiliary brake 150. A more detailed description of an example of this brakes was given in FIG. 1. The radiator 151 delivers the cooling water for this brake.

According to this invention, the auxiliary brakes are actuated before the wheel brakes generally, and, more specifically, the auxiliary brakes 153$_1$, 153$_2$ are actuated advantageously alone at the beginning of the braking operation, then the auxiliary brake 150, 154 and finally the wheel brakes are effected.

The actuating means (not shown) of the embodiments of FIGS. 11–15 comprise a common brake pedal for all brake types and separate brake circuit conduits from this pedal to the brakes. Between the pedal and these circuits are control means which actuate subsequently the three brake types according the described modes when depressing the pedal.

What I claim is:

1. In a vehicle with an engine and a radiator, with a plurality of axles, at least one including driven wheels and one including non-driven wheels and a transmission system including driving shafts drivingly engaged with said driven wheels and the vehicle engine, a brake system including wheel brakes and at least one drive line auxiliary brake, characterized by the combination of:

wheel brakes in the wheels of at least one of said axles, at least one auxiliary brake and actuating means including a singular application means, a first brake circuit means for operating said wheel brakes and a second brake circuit means for operating said auxiliary brake, both of said brake circuit means being operable in response to said actuating means;

said auxiliary brake being a friction disc brake comprising friction elements which are dry on their friction engaging surfaces and being free of self-intensification effects, said auxiliary brake being designed with a capacity to absorb at least twice the maximum brake energy as that which can be absorbed by the said wheel brakes, and means for watercooling said auxiliary brakes;

and actuating means including means for operating said auxiliary brake alone in a first mode of operation, during which said wheel brakes remain unbraked, and for operating in a subsequent second mode of operation said wheel brakes in addition to said auxiliary brake, the braking moment of the auxiliary brake increasing at a slower rate in the second mode than in the first mode, the total applied braking moment thus being distributed to each wheel approximately in proportion to the distribution of the dynamic load to that wheel.

2. A brake system according to claim 1, wherein adjusting means are provided which cause a constant or at least a slower increasing of the brake moment of the auxiliary brakes after terminating of said first mode.

3. A brake system according to claim 1, wherein:

said vehicle comprises a front axle having front wheels on its ends, said wheel brakes being disc brakes located in said front wheels and being hydraulically actuated by said singular application mean:

said vehicle further comprises a hollow rear axle having a differential gear located therein, said driving shafts include two shaft parts extending from said differential gear to opposed wheels each provided with planetary gearings:

said auxiliary brakes include laminations mounted on said shaft parts for rotation therewith, brake rings adjacent said laminations having hollow compartments and conduits between said radiator and said compartments, at least some of said brake rings being axially movable, hydraulically actuating means to move said movable brake rings towards said laminations for friction engagement to brake said shaft parts:

said singular application mean comprises a brake pedal, hydraulic means for operating said actuating means of said auxiliary brake, hydraulic means for operating said wheel brakes, and a spring mean operatively interposed between said pedal and said two hydraulic means such that upon application of the brake pedal the said auxiliary brakes and the said wheel brakes are operated according to said first and second modes.

4. A brake system according to claim 1, wherein said vehicle comprises a non-driven front axle having front wheels on its ends, said wheel brakes being disc brakes located in said front wheels and being hydraulically operated through conduits by said singular application mean:

said vehicle further comprises a hollow rear axle having a differential gear located therein, said driving shafts include two shaft parts extending from said differential gear to opposed wheels, a planetary gearing on the ends of each said shaft parts and disc brakes in said wheels hydraulically operated by said singular application mean through conduits separate from said front brake conduits, said vehicle further comprises a transmission, a driving shaft from said transmission to said differential gear and said auxiliary brake adapted to brake said driving shaft being fastened to a stationary part of the vehicle and hydraulically operated through conduits separate from said conduits for the wheel brakes, said auxiliary brake being connected to the said radiator to provide a water cooling circulation therethrough, said singular application mean including a brake pedal for controlling operation of the wheel brakes and the auxiliary brakes and control means interposed between said brake pedal and said conduits to said brakes:

said control means including fluid operated means to operate said brakes, a first means for operating the auxiliary brake initially with an increasing pressure up to a predetermined pressure value, and thereafter with a constant pressure, and second means for operating the wheel brakes with an increasing pressure commencing when the said predetermined pressure value of the friction brake has reached said predetermined value, and wherein an actuating means is provided separate from said singular application mean for independently operating said auxiliary brake.

5. A brake system according to claim 1, wherein said vehicle has two driven rear wheels each provided with a disc wheel brake and two non-driven front wheels also provided with a disc wheel brake:

said singular application mean includes a brake pedal and separate servo-actuated circuits operated by the brake pedal to actuate said auxiliary brake and said wheel brakes according said first and second mode, an anti-locking means is provided in said brake-system, comprising sensors in each wheel, connections from said sensors to a control unit and connections from said control unit to hydraulic control means provided in said circuits, and wherein said hydraulic control means for the auxiliary brake and the rear wheel brakes have one of said connections in common, causing simultaneously release of the rear wheel brakes and the auxiliary brake when a signal is delivered from a sensor in the rear wheels.

6. A brake system according to claim 1, wherein said wheel brake provided in the front wheels of said vehicle comprises an annular brake housing enclosing an annular space open on its radially outer circumference, said brake housing being mounted with its inner circumference to the hub of said wheel for rotation therewith, said wheel brake further comprises brake carriers detachably fastened on a stationary part of said vehicle and extending over said annular space, said carriers support segmental brake shoes extending in said annular space and hydraulic actuating means interposed between said brake shoes to move them apart.

7. A brake system according to claim 1, wherein the auxiliary brake comprises a lamination having linings and being mounted on said axle shaft for rotation therewith, annular members on both sides of said linings having friction surfaces facing said linings, said annular members having annular hollow compartments connected to a cooling system, one of said annular members being mounted in a stationary part of said service brake, the other annular member being fastened to a brake ring, said brake ring is held against circumferential movement but axially movable, said auxiliary brake further comprising hydraulic or mechanical actuating means to move said movable brake ring towards said lamination to provide friction contact between said linings and said friction surfaces.

8. A brake system according to claim 1 in which said vehicle includes a differential, and including a separate driving shaft from the differential to each of a pair of opposed driving wheels, said auxiliary brake including a separate friction brake mounted to brake each of said shafts.

9. A braking system according to claim 1, in which the said singular application means of the actuation means comprises a brake pedal, hydraulic means for applying the auxiliary brake, and a spring means operatively interposed between the pedal and the hydraulic means such that upon application of the brake pedal, the brakes are operated according to said first and second modes.

10. A braking system according to claim 9, said driving shaft drivingly engaged with the rear wheels of the vehicle, means for hydraulically operating said wheel brakes in response to actuation of said brake pedal, and said spring means including a spring operatively located between the pedal and the hydraulic means of the wheel brakes to start operation of the auxiliary brake before operation of the wheel brakes.

11. A braking system according to claim 1, said actuating means including fluid operated means to operate said brakes, a first means for operating the auxiliary brake initially with an increasing brake moment up to a predetermined brake moment value, and thereafter with a constant brake moment, and second means for operating the wheel brakes with an increasing brake moment commencing when the said predetermined brake moment value of the auxiliary brake has reached said predetermined value.

12. A braking system according to claim 11, said vehicle including front and rear wheels, the driving shaft being drivingly engaged with the rear wheels of the vehicle, and wherein the said actuating means includes means for operating the wheel brakes of said front and rear wheels with said increasing brake moment commencing when the said predetermined brake moment value has been reached.

13. A braking system according to claim 1, wherein the wheel brakes of said front and rear wheels are disc brakes.

14. A braking system according to claim 1, said actuating means including a first servo actuated circuit to operate the auxiliary brake and a second servo actuated circuit for operating the wheel brake means.

15. A braking system according to claim 14, including a mechanical holding brake separate from said servo actuated circuits for applying said auxiliary brake, and including a further servo actuated circuit separate from said servo actuated circuits for operating said auxiliary brake, said further servo actuated circuit opposing a spring means normally acting to actuate said auxiliary brake.

16. A braking system according to claim 15, said single application means comprising a cam having a plurality of raised portions, each of said servo actuated circuits having associated with it a cam follower operated by one of said raised portions.

17. In a truck-trailer combination comprising a truck having driven and non-driven wheels axles and a driving shaft and a trailer having non-driven wheel axles, a brake system including wheel brakes and drive line auxiliary brakes, characterized by the combination of:

brakes in the wheels of at least some of said axles, an auxiliary brake in the truck and an auxiliary brake in the trailer and actuating means including a singular application means and separate brake circuit means for said wheel brakes, said truck auxiliary brake and said trailer auxiliary brake, said truck auxiliary brake being a friction disc brake comprising friction elements which are dry on their friction engaging surfaces and free of self-intensification effects, said auxiliary brake being designed with a capacity to absorb at least twice the maximum brake energy as that which can be absorbed by the said wheel brakes, and means for watercooling said auxiliary brake, said trailer auxiliary brake operating on opposed pairs of wheels, the auxiliary brake for each pair of opposed wheels being a friction disc brake comprising friction elements which, in operation, are dry on their friction engaging surfaces and free of self-intensification effects, said auxiliary brake being designed with a capacity to absorb at least twice the maximum brake energy as that which can be absorbed by the said wheel brakes, and means for watercooling said auxiliary brake;

said actuating means including means for operating said trailer auxiliary brakes alone in a first mode of operation during which the other brakes remain unbraked, for operating in a second subsequent mode of operation said truck auxiliary brake in addition to said trailer service brake, and in a subsequent third mode of operation operating said wheel brakes in addition to said auxiliary brakes to distribute the total applied brake moment to each wheel in proportion to the distribution of the dynamic load to that wheel.

* * * * *